United States Patent
Ueno et al.

[15] 3,697,496
[45] Oct. 10, 1972

[54] METHOD FOR THE POLYMERIZATION OF A COMPOUND CONTAINING AN OXIRANE GROUP

[72] Inventors: Katsuji Ueno, Hirakata-shi, Osaka; Takao Oshima, Ibaraki-shi, Osaka; Hideo Seki, Toyonaka-shi, Osaka, all of Japan

[73] Assignee: Sumitomo Chemical Co., Ltd., Osaka, Japan

[22] Filed: July 25, 1969

[21] Appl. No.: 845,047

[30] Foreign Application Priority Data

July 25, 1968   Japan ..................43/52852
March 1, 1969   Japan ..................44/15705

[52] U.S. Cl.............260/2 A, 252/431 F, 260/47 ER, 260/88.3 A
[51] Int. Cl. ...............................................C08g 23/14
[58] Field of Search............260/2 EA, 88.3 A, 47 EP

[56] References Cited

UNITED STATES PATENTS

| | | | |
|---|---|---|---|
| 3,244,646 | 4/1966 | Naro et al. | 260/2 |
| 3,271,328 | 9/1966 | Hill | 260/2 |
| 3,379,660 | 4/1968 | Hsieh | 260/2 |
| 3,384,603 | 5/1968 | Elfers | 260/2 |
| 3,396,125 | 8/1968 | Wofford et al. | 260/2 |
| 3,408,313 | 10/1968 | Foll | 260/2 |
| 3,409,565 | 11/1968 | Lal | 260/2 |
| 3,422,034 | 1/1969 | Calderon | 260/2 |
| 3,459,685 | 8/1969 | Tomomatsu | 260/2 |

OTHER PUBLICATIONS

Furukawa et al., Chemical Abstracts 59, 6535e (1963).
Okado et al., Chemical Abstracts 59, 8900g (1963).
Okado et al., Chem Abst. 59, 8900g (1963).
Okado et al., Chem Abst. 59, 11684g (1963).
Daimon et al., Chem. Abstr. 59, 12946c (1963).
Socony Mobil, Chem Abstr. 64, 2236h (1966) (1966).

*Primary Examiner*—William H. Short
*Assistant Examiner*—E. Nielsen
*Attorney*—Sughrue, Rothwell, Mion, Zinn & Macpeak

[57] ABSTRACT

Polyalkylene oxides are produced advantageously by contacting an alkylene oxide monomer with a novel and excellent catalyst obtained by reacting (i) aluminum alkoxide, (ii) phosphoric acid or an organophosphoric acid ester, and (iii) an aliphatic alcohol and/or an organometallic compound of metals of Group II or III of Mendeleev's Periodic Table.

21 Claims, No Drawings

METHOD FOR THE POLYMERIZATION OF A COMPOUND CONTAINING AN OXIRANE GROUP

BACKGROUND OF THE INVENTION

1. Field of the Invention

The present invention relates to a method for the polymerization of alkylene oxide. More particularly, the present invention is concerned with a method for the polymerization of alkylene oxide using a novel polymerization catalyst.

2. Description of the Prior Art

It has been known that polyoxyalkylene oxide is useful as a paper processing agent or as a flocculant for high molecular weight compounds or synthetic rubber.

Heretofore, it has been known to polymerize alkylene oxide by employing Friedel-Crafts catalysts such as boron trifluoride, tin tetrachloride, zinc chloride, acid or alkali, alkaline earth metal salts, and the like, and also, propylene oxide complex compounds with ferric chloride and organozinc water.

However, in order to produce a polymer having excellent properties utilizing these known catalysts, it is usually required to employ a highly pure monomer. Further, the catalysts are difficult to obtain and handle.

Furthermore, the specification of Japanese Patent Publication No. 9445/63 has taught a method for the polymerization of alkylene oxide by using, as a catalyst, a reaction product of aluminum alkoxide with a phosphorous compound containing a P-OH linkage. However, when such a catalyst is used, it brings about inferior results in polymer yield and can only give a low molecular weight polymer.

In addition, when organometallic compounds of metals of Groups II and III of Medeleev's Periodic Table are used as catalysts, the polymerization rate is too low and, except when an organomagnesium compound is utilized, any polymer thus obtained is low in polymerization degree. In the case of using the organomagnesium compound as the catalyst, although a polymer having an intrinsic voscosity of more than 10 dl/g can be produced, the velocity of the polymerization is remarkably low, similarly to that obtained when other organometallic compounds are used, and is, therefore, considered to have almost no value in industry.

SUMMARY OF THE INVENTION

An object of the present invention is to provide a method for polymerizing alkylene oxide profitably in an industrial process.

Other objects will be apparent from the following description.

Accordingly, the present invention provides a practical and useful method for the polymerization of alkylene oxide which comprises contacting alkylene oxide with a catalyst obtained by the reaction of (1) aluminum alkoxide, (2) phosphoric acid or an organophosphoric acid ester and (3) an alcohol and/or an organometallic compound of metals of Group II or Group III of Mendeleev's Periodic Table.

DETAILED DESCRIPTION OF THE INVENTION

The present inventors have found that when a product, obtained by the reaction of aluminum alkoxide with phosphoric acid or an organophosphoric acid ester and at least one alcohol or one organometallic compound of Groups II or III of Mendeleev's Periodic Table, is used as the catalyst, polyalkylene oxide having a high molecular weight can be formed quickly and a remarkable increase in the intrinsic viscosity of the polymer, per weight of catalyst, can be achieved.

The technical scope in Japanese Patent Publication No. 9445/63 is based on the reaction of aluminum alkoxide with a phosphorous compound containing a P-OH linkage in an inert organic solvent such as benzene or hexane. On the contrary, according to the present invention, a high molecular weight polymer which has a different structure can be unexpectedly produced by using a catalyst which is obtained by reacting both of them in the presence of an alcohol. Further, a high molecular weight polymer can be produced unexpectedly by the use of a reaction product of aluminum alkoxide with phosphoric acid or an organophosphoric acid ester and an organometallic compound of metals of Groups II or III.

In the process of the present invention, any compound containing an oxirane group can generally be polymerized or copolymerized. Typical examples include alkylene oxides such as ethylene oxide, propylene oxide, 1,2-epoxybutane, 2,3-epoxybutane, epichlorohyrin, epibromohydrin, trifluoromethyl ethylene oxide, cyclohexene oxide, methylglycidyl ether, glycidol, phenylglycidyl ether, butadiene monoxide, butadiene oxide, allylglycidyl ether, glycidyl acrylate, styrene oxide, mixtures thereof or the like.

The aluminum alkoxide used herein is represented by the formula:

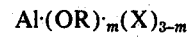

wherein R is the same or different primary, secondary or tertiary alkyl of from one to eight carbon atoms; X is halogen or hydroxyl and $m$ is an integer of 1, 2 or 3. Examples of the alkyl group represented by R in the formula are: primary alkyls such as methyl, ethyl, n-propyl, n-butyl, isobutyl, n-pentyl, i-pentyl, n-octyl; secondary alkyls such as i-propyl, sec-butyl, ethyl-n-hexyl; and tertiary alkyls such as t-butyl, t-pentyl and the like.

Examples of the halogen include chlorine, bromine and fluorine.

Typical examples of the phosphoric acids which may be present in the invention include orthophosphoric acid, condensed phosphoric acid and phosphorous acid.

The phosphoric acid ester used herein is represented by the formula:

(wherein R' is an alkyl of from one to nine carbon atoms or phenyl, and $n$ is an integer of 1 or 2). Typical examples are: monomethyl phosphate, diethyl phosphate, mono-n-butyl phosphate, di-i-butyl phosphate, diphenyl phosphate, and the like, and mixtures thereof.

The alcohol used herein is a primary, secondary, or tertiary aliphatic alcohol of from one to 17, and preferably from one to nine carbon atoms. Typical examples are: methyl alcohol, ethyl alcohol, iso-propyl alcohol, tert-butyl alcohol, sec-butyl alcohol, n-butyl alcohol, n-amyl alcohol, n-octyl alcohol, n-stearyl alcohol and the like.

In addition, the organometallic compound of the metal of Groups II or III of Mendeleev's Periodic Table used herein is one containing an alkyl group of from 1 to 9 carbon atoms. The several embodiments include a single compound or a mixture of compounds exemplified by organomagnesium compounds such as dimethylmagnesium, diethylmagnesium, di-n-propylmagnesium, di-i-propylmagnesium, n-butylmagnesium, di-i-butylmagnesium, ethyl-n-propylmagnesium, diphenylmagnesium, and various organometallic compounds in which the magnesium atom of those compounds is replaced by a metal of Group II of Mendeleev's Periodic Table, such as beryllium, calcium, strontium, barium, zinc, cadmium or mercury; organozinc compounds such as calcium tetramethylzinc, calcium tetraethylzinc, calcium tetrapropylzinc, calcium tetrabutylzinc, calcium dimethyldiethylzinc, strontium tetraethylzinc, barium tetraethylzinc; and various organometallic compounds in which the zinc atom of those compounds is replaced by a metal element of Group II such as cadmium or mercury; organoaluminum compounds such as trimethylaluminum, triethylaluminum, tri-n-propylaluminum, tri-i-propylaluminum, tri-n-butylaluminum, tri-i-butylaluminum, dimethylmonoethylaluminum, monomethyldiethylaluminum, diethylmono-n-propyl aluminum, tricyclohexylaluminum, triphenylaluminum; and various organometallic compounds in which the aluminum atom of those compounds is replaced by a metal of Group III of Mendeleev's Periodic Table, such as boron, magnesium pentamethylboron, magnesium pentamethylaluminum; and various organo-metallic compounds in which the magnesium atom of these compounds is replaced by a metal of Group II of Mendeleev's Periodic Table such as calcium, strontium, zinc, cadmium or the like.

In carrying out the preparation of the catalyst in the present invention, the preferred amount of phosphoric acid or organophosphoric acid ester is about 0.05–3 mole, and preferably 0.2–2 mole, per 1 mole of aluminum alkoxide.

The preferred amount of alcohol to be added is from 1 to 100, more preferably 5 to 50, parts by weight based on the total amount of aluminum alkoxide and phosphoric acid or organophosphoric acid ester. When the amount of alcohol added is less than that limit, it is difficult to carry out the reaction uniformly, and furthermore, the reaction takes a long time.

The amount of the organometallic compound of the metal of Groups II or III of Mendeleev's Periodic Table may not especially be limited, and preferably, is from 0.01 to 10 moles, more preferably 0.05 to 5 moles, per 1 mole of aluminum alkoxide.

In the system containing alcohol, good results can be achieved by increasing the addition amount slightly more than that limit last mentioned.

The production of the catalyst used in the present invention can be achieved by the reaction of aluminum alkoxide with a phosphoric acid or an organophosphoric acid ester and alcohol, by the reaction of aluminum alkoxide with a phosphoric acid or an organophosphoric acid ester and an organometallic comound of a metal of Groups II or III of Mendeleev's Periodic Table, or by the reaction of a reaction product, derived from aluminum alkoxide and a phosphoric acid or an organophosphoric acid ester, with an organometallic compound of a metal of Groups II or III of Mendeleev's Periodic Table.

In producing such a catalyst by the reaction of aluminum alkoxide with a phosphoric acid or an organophosphoric acid ester, an alcohol, the reaction is preferably carried out in the presence of alcohol. It is therefore, suitable to add a solution of a phosphoric acid or an organophosphoric acid ester in alcohol to a solution of aluminum alkoxide in an inert medium. The reaction of aluminum alkoxide with the phosphoric acid or the organophosphoric acid ester in the presence of alcohol is preferably practiced at a temperature ranging from −80° to 200° C, preferably from 20° to 130° C, and, if necessary, under increased or reduced pressure. After the completion of the reaction, any unreacted alcohol is distilled off to dryness to provide an obtainable reaction product as catalyst; or the unreacted alcohol is completely removed by distilling it off after the addition of a solvent having a higher boiling point than that of the alcohol while not influencing the polymerization reaction, thereby providing catalyst product, in a form of a suspension in the solvent.

Examples of the inert solvent include aliphatic hydrocarbons such as hexane, i-hexane, 3-methylpentane, 2,3-dimethylbutane, n-heptane, 2,2-dimethylpentane, 2-methylhexane, 3-methylhexane, n-octane, i-octane, n-nonane and the like; alicyclic hydrocarbons including cyclobutane, cyclopentane, cyclohexane, cycloheptane, cyclooctane, cyclononane, decalin and derivatives; and ethers such as diethyl ether, di-n-propyl ether, di-i-propyl ether, di-n-butyl ether, di-i-butyl ether, di-sec-butyl ether, diethylene glycol diethyl ether, anisole, phenetole, diphenyl ether, tetrahydrofuran, 1,4-dioxane, 1,3-dioxane and the like.

In order to produce the present catalyst, it may be possible to mix a reaction product, which is obtained by the reaction of aluminum alkoxide with a phosphoric acid or organophosphoric acid ester in the presence of the inert solvent at from −80° to 200° C, preferably from 20° to 130° C, with the organometallic compounds of meals of Groups II or III of Mendeleev's Periodic Table in the presence or absence of alcohol. In this case, it may be preferable to carry out the preparation of the catalyst in the inert solvent, and the catalyst (mixture of the reaction product with the organometallic compound) can also be produced at the proper temperature, but preferably from −50° to 150° C under atmospheric pressure with the proviso that the higher the temperature, the shorter the preparation time. If necessary, it is also possible to carry out the process under an increased or reduced pressure. Furthermore, since the reaction can proceed very rapidly under the usual conditions of room temperature and atmospheric pressure, such a catalyst is frequently obtained, without a specific treatment, by only mixing the two components just before the polymerization. In the preparation of the catalyst, there is a method of preparing the catalyst by mixing the two components prior to the polymerizing; and a method comprising initiating the polymerization properly using one component and adding the other during polymerization, or a method comprising carrying out the preparation of the catalyst while continuously adding one or two components to the reaction system and successively polymerizing the same. Furthermore, it is also possible to mix the two components in the raw material for polymerization. This last-mentioned method is superior in bulk polymerization.

In addition, the reaction product of aluminum alkoxide with the phosphoric acid or organophosphoric acid ester containing by-produced alcohol may be used directly, but it is preferable to remove the alcohol by distillation or any other proper method, since the presence of the alcohol makes the required amount of the organometallic compound high and the activity of the catalyst low, thereby lowering the polymerication degree of the alkylene oxide polymer. In this case, removal of the medium used for the reaction of aluminum alkoxide with the phosphoric acid or organophosphoric acid ester may not always be needed, if it is not influencing the polymerization reaction, but it is also possible to use the catalyst after removing the medium by, for example, drying under a reduced pressure. Moreover, the present method is successful in contacting a reaction product of aluminum alkoxide with the phosphoric acid or organophosphoric acid ester in the presence of the alcohol with organometallic compounds of metals of Groups II or III of Mendeleev's Periodic Table. In this case, it is necessary to contact the reaction product with the organometallic compounds substantially in the absence of alcohol. Therefore, removal of the alcohol is required after reacting aluminum alkoxide with the phosphoric acid or organophosphoric acid ester in the presence of alcohol, and the residue of an excessive amount of alcohol in the system increases the amount of the organometallic compounds to be added.

In the practice of contacting the aforesaid reaction product with the organometallic compound, it may be successfully achieved in the same manner as in obtaining the catalyst from the aluminum alkoxide, phosphoric acid or organophosphoric acid ester and organometallic compound.

According to the method of the present invention, the polymer of the alkylene oxide can be obtained by contacting the alkylene oxide with the catalyst, prepared according to the aforesaid method, in the presence or absence of a reaction medium. The preferred amount of the catalyst used is from 0.05 to 10 percent by weight, more preferably from 0.2 to 5 percent by weight of the weight of the alkylene oxide monomer.

The medium for the polymerization reaction may be selected freely from any conventional medium, the only requirements being that the medium be in a liquid state under the polymerization conditions, and that it does not influence the polymerization reaction and is inert to the formed polymer. Typical examples of the medium include benzene, toluene, xylene, ethylbenzene, n-pentane, i-pentane, n-hexane, n-heptane, i-octane, cyclopentane, cyclohexane, decalin, 1,4-dioxane, anisole, ethylene glycol, dimethyl ether, diethyl ether, dibutyl ether and the like, or mixtures thereof. It may also be advantageous to use the same medium as in the preparation of the catalyst.

The polymerization reaction of the present invention can be conducted at various temperatures and pressures.

Thus, for example, the polymerization of propylene oxide can be conducted at temperatures of from −50° to 200° C under atmospheric pressure using a proper medium. It is, of course, possible to conduct the polymerization reaction under increased or reduced pressure. The present procedure can advantageously be carried out in any batch operation, semibatch operation or continuous operation.

According to the present invention, various kinds of alkylene oxide polymers with excellent properties can easily be obtained. Ethylene oxide polymer is useful as a water soluble high molecular weight compound, a paper-treating agent and as a flocculant for a high molecular weight compound, and, in addition, copolymers of propylene oxide with allyl glycidyl ether and polyepichlorohydrin and ethylene oxide with epichlorohydrin are valuable in the rubber synthesizing industry.

The raw materials for producing the catalyst used in the present invention (aluminum alkoxide, phosphoric acid and organophosphoric acid esters) are lower in cost than the organozinc compounds, and further, since the organometallic compound used in the present invention can give a catalyst which has a sufficient activity even in a far smaller amount than when a binary system catalyst consisting of organozinc compound and water is used, the method of the present invention is advantageous in industry.

The following specific examples are intended to illustrate several embodiments of the present invention and these can be suitably modified within the scope of the invention.

In these examples, the intrinsic viscosity $[\eta]$ is measured at 25° C, in benzene.

EXAMPLE 1

To a 1 liter (volume) three-necked flask equipped with a stirrer, a thermometer and a condenser, was charged a solution of 24.6 g (100 mmole) of aluminum-tri-n-butylalkoxide in 200 ml. of benzene. A solution of 9.8 g (100 mmole) of phosphoric acid (85 percent commercial phosphoric acid was dehydrated at 100° C under a reduced pressure of 0.5 mmHg for 7 hours, and the purity was confirmed to be about 98 percent by titration thereof) in 600 ml. of n-butyl alcohol was dropped therein, thereby forming a white paste-like precipitate. The resultant mixture was refluxed at 115° C for 4 hours while stirring, then benzene and the unreacted n-butyl alcohol were distilled off and thereafter the reaction mixture was dried at 110° C under a reduced pressure of 0.05 mmHg for 1.5 hours. The reaction product was obtained in white powder with a yield of 16.6 g. 5.8 g of propylene oxide was charged into a hard test tube having an 18 mm inner diameter and a length of 100 mm and flashed with nitrogen, and, after cooling by dry ice, 50 mg. of the catalyst was added and then the test tube was sealed. The polymerization reaction was conducted for 10 hours while shaking in a constant temperature water bath at 80° C, and the tube was opened after cooling by dry ice. Thereafter, the product was dissolved in a small quantity of benzene and evaporated to dryness, thereby obtaining a polymer having rubber elasticity. The yield was 47 percent, and the intrinsic viscosity $[\eta]$ was 1.6 (dl/g).

COMPARATIVE EXAMPLE 1

Polymerization of propylene oxide was conducted in a manner similar to that in Example 1 with the exception that aluminum-tri-n-butyl alkoxide (singly) or phosphoric acid (singly), respectively, was used as the catalyst. In the case wherein the aluminum-tri-n-butyl alkoxide was used, a small quantity of a viscous low molecular weight polymer was obtained, but no polymer was produced when phosphoric acid was used alone.

COMPARATIVE EXAMPLE 2

A catalyst produced in a manner similar to that in Example 1, with the exception that benzene was used instead of n-butyl alcohol (the catalyst corresponded to one described in Japanese Patent Publication No. 9445/63), was employed to polymerize propylene oxide in a manner similar to that in Example 1, but the yield of the polymer was only 4.1 percent and only a wax-like low molecular weight polymer was given.

It was also confirmed that the shape and chemical structure of the catalyst was different from that of the catalyst produced according to Example 1 by comparison of their elementary analyses, infrared spectrum, and the like.

EXAMPLES 2, 3 and 4

Molar ratios of aluminum-tri-n-butyl alkoxide and phosphoric acid, respectively, were modified, and polymerization of propylene oxide was conducted under the same conditions as in Example 1.

Yield of polymer and intrinsinc viscosity $[\eta]$ were as in Table I.

TABLE 1

| Example | aluminum-tri-n-butyl alkoxide | Phosphoric acid (molar ratio) | Yield (%) | $[\eta]$(dl/g) |
|---|---|---|---|---|
| 2 | 1 | 0.25 | 14.0 | 1.5 |
| 3 | 1 | 0.50 | 51.4 | 2.0 |
| 4 | 1 | 2.00 | 12.1 | 1.9 |

EXAMPLES 5 and 6

4.08 g (20 mmole) of aluminum-tri-iso-propyl alkoxide and 0.98 g (10 mmole) of phosphoric acid were mixed in 150 ml. of iso-propyl alcohol at room temperature while stirring for 30 minutes, then the total amount was divided into two portions. From one portion, the unreacted iso-propyl alcohol was evaporated at room temperature, and then dried at room temperature under a reduced pressure for 2 hours. It was employed as a catalyst for Example 5. The other one was subjected to conditions in order to reflux the iso-propyl alcohol at 80° C for 4 hours, and then dried at 80° C under a reduced pressure for 2 hours. The product was employed as a catalyst for Example 6.

Polymerization of propylene oxide was conducted using 50 mg. of each catalyst under the same conditions as in Example 1, and the yield of polymer and intrinsic viscosity $[\eta]$ thereof were as in Table 2.

TABLE 2

| Example | Yield (%) | $[\eta]$ dl/g |
|---|---|---|
| 5 | 34.4 | 1.8 |
| 6 | 20.0 | 1.5 |

EXAMPLE 7

3.25 g. (20 mmole) of aluminum-di-iso-propyl monohydroxy alkoxide and 0.98 g. (10 mmole) of phosphoric acid were mixed in 100 ml. of n-amyl alcohol, and the resultant mixture was refluxed at 139° C for 4 hours, and thereafter dried at 139° C under a reduced pressure for 1 hour to obtain the catalyst.

Polymerization of propylene oxide was conducted using 50 mg. of the catalyst, under the same conditions as in Example 1, thereby obtaining polymer with a yield of 59.8 percent and with an intrinsic viscosity $[\eta]$ of 2.8 (dl/g).

EXAMPLE 8

4.92 g (20 mmole) of aluminum-tri-n-butyl alkoxide and 1.54 g (10 mmole) of mono-n-butyl phosphate were added to 100 ml. of n-butyl alcohol, and the resultant mixture was refluxed at 110° C for 4 hours, and thereafter dried at 110° C under a reduced pressure for 4 hours to obtain the catalyst.

Polymerization of propylene oxide was conducted, using 50 mg. of the catalyst, under the same conditions as in Example 1, thereby obtaining polymer in a yield of 11.3 percent and an intrinsic viscosity $[\eta]$ of 1.9 (dl/g.).

EXAMPLES 9–14

Polymerization of ethylene oxide was conducted using the catalyst obtained in the same manner as in Example 1 and the results were as in Table 3.

TABLE 3

| ex. | Amt. of catalyst (g) | EO (g) | n-heptane (ml) | Polymerization Temp. (°C) | Polymerization Time (hr.) | Polymer yield (g) | Polymer yield ratio (%) | $[\eta]$ dl/g |
|---|---|---|---|---|---|---|---|---|
| 9 | 0.050 | 4.82 | 10 | 15 – 20 | 24 | 0.45 | 9.4 | 1.75 |
| 10 | 0.100 | 4.82 | 10 | 15 – 20 | 24 | 1.07 | 22.2 | 2.25 |
| 11 | 0.100 | 4.82 | 10 | 15 – 20 | 48 | 1.41 | 29.3 | 3.93 |
| 12 | 0.100 | 7.23 | 7.5 | 15 – 20 | 24 | 1.51 | 20.9 | 3.57 |
| 13 | 0.050 | 4.82 | 5 | 70 | 3 | 2.19 | 45.0 | 2.05 |
| 14 | 0.050 | 3.37 | 7 | 70 | 8 | 2.46 | 73.0 | 1.75 |

EXAMPLE 15

50 mg. of a catalyst obtained in the same manner as in Example 1, with the exception that aluminum di-n-butyl monochloro alkoxide was used instead of aluminum-tri-n-butyl alkoxide, and 5.0 g. of epichlorohydrin was polymerized in a manner similar to that in Example 1, with the exception that the polymerization time was 5 hours, thereby forming a polymer with a rubber elasticity in a yield of 90 percent.

EXAMPLE 16

30 mg. of the same catalyst as in Example 1, 3.96 g. of ethylene oxide and a diluent of 40 mg. of zinc diethyl in 3 cc. of heptane were charged to a tube and sealed, and thereafter the contents were stirred for 6 hours in a constant temperature water bath at 80° C. After cooling by dry ice and opening the tube, the product was dissolved in a small amount of benzene, and then poured into a great amount of ether, thereby obtaining the polymer in white powder in a yield of 92 percent. The intrinsic viscosity [$\eta$] thereof was 5.0 dl/g.

EXAMPLE 17

Polymerization of ethylene oxide was conducted, under conditions similar to those in Example 16, with the exception of carrying out the polymerization without using zinc diethyl, thereby forming polymer in a yield of 80 percent and with an intrinsic viscosity [$\eta$] of 2.0 dl/g.

COMPARATIVE EXAMPLE 3

Polymerization of ethylene oxide was conducted, under polymerization conditions similar to those in Example 16 with the exception of using 40 mg. of zinc diethyl as the catalyst, thereby forming almost no polymer.

EXAMPLE 18

4.08g (20 mmole) of aluminum tri-iso-propoxide and 0.98 g (10 mmole) of phosphoric acid were added to 100 ml. of n-amyl alcohol, and the resultant mixture was refluxed at 139° C for 4 hours, and thereafter dried at 139° C under a reduced pressure for 1 hour. 4.94 g of propylene oxide was polymerized, using 40 mg. of the aforesaid reaction product and 20 mg. of zinc diethyl as the catalyst, at 80° C for 7 hours, thereby obtaining polypropylene oxide in a yield of 80 percent and having an intrinsic viscosity [$\eta$] of 5.7 dl/g.

EXAMPLE 19

Polymerization of propylene oxide was conducted, under conditions similar to those in Example 18 with the exception of carrying out the polymerization, without using zinc diethyl, thereby forming polymer in a yield of 50 percent and having an intrinsic viscosity [$\eta$] of 2.0 dl/g.

COMPARATIVE EXAMPLE 4

Polymerization of propylene oxide was conducted, under conditions similar to those in Example 18 with the exception of using 20 mg of zinc diethyl as the catalyst, thereby forming no polymer.

EXAMPLE 20

2.04 g (10 mmole) of aluminum-tri-iso-propoxide was dissolved in 40 ml. of decalin. The resultant solution was charged to a reactor, substituted previously with nitrogen and equipped with a reflux condenser, a thermometer, and a stirrer, and heated to about 80° C while stirring slowly.

A diluent of 0.6 ml. of commercial special grade phosphoric acid (corresponding to 10 mmole of orthophosphoric acid) in 10 ml. of i-propyl alcohol was gradually added in 2 hours while stirring vigorously, and the stirring was continued. Then, 50 ml. of n-heptane was added, and heated to 130° C to distill off all fractions having boiling points lower than that of n-heptane.

Into the thus obtained reaction product, 10 mmole of aluminum triethyl was added, the resultant mixture was stirred at 80° C for 1 hour, and thereafter 100 ml. of n-heptane and 150 g of epichlorohydrin were added. The polymerization was conducted at 50° C for 5 hours, thereby obtaining polyepichlorohydrin in a yield of 90 percent.

EXAMPLE 21

Polymerization of epichlorohydrin was conducted, under conditions similar to those in Example 20, with the exception of carrying out the polymerization without using aluminum triethyl, thereby obtaining no polymer.

COMPARATIVE EXAMPLE 5

Polymerization of epichlorohydrin was conducted under conditions similar to those in Example 20 with the exception of using 10 mmole of aluminum triethyl as a catalyst, thereby obtaining no polymer.

What is claimed is:

1. A method for the polymerization of a mono-oxirane compound which comprises contacting said mono-oxirane compound with a catalyst obtained by reacting (i) an aluminum alkoxide represented by the formula:

wherein R is the same or a different alkyl selected from the group consisting of primary, secondary and tertiary alkyls having from one to eight carbon atoms, X is a halogen or a hydroxyl group, and $m$ is an integer of 1, 2 or 3 with (ii) a member selected from the group consisting of a phosphoric acid and an organo-phosphoric acid ester, said ester being represented by the formula:

wherein R' is an alkyl group of from one to nine carbon atoms, or a phenyl group, and $n$ is an integer of 1 or 2, and (iii) an aliphatic alcohol of from 1 to 17 carbon atoms.

2. A method according to claim 1, wherein said mono-oxirane compound is selected from the group consisting of ethylene oxide, propylene oxide, 1,2-epoxybutane, 2,3-epoxy butane, epichlorohydrin, epibromohydrin, trifluoromethylethylene oxide, cyclohexene oxide, methylglycidyl ether, glycidol, phenyglycidyl ether, butadiene monoxide, allylglycidyl ether, glycidyl acrylate, styrene oxide and mixtures thereof.

3. A method according to claim 1, wherein said alkyl of said aluminum alkoxide is selected from the group consisting of methyl, ethyl, n-propyl, n-butyl, isobutyl, n-pentyl, iso-pentyl, iso-propyl, sec-butyl, t-butyl and t-pentyl.

4. A method according to claim 1, wherein said aluminum alkoxide is selected from the group consisting of aluminum-tri-n-butyl alkoxide, aluminum-tri-isopropyl alkoxide, aluminum di-isopropyl monohydroxyl alkoxide and aluminum di-n-butyl monochloro alkoxide.

5. A method according to claim 1 wherein said phosphoric acid is selected from the group consisting of orthophosphoric acid, condensed phosphoric acid and phosphorous acid.

6. A method according to claim 1 wherein said organophosphoric acid ester is selected from the group consisting of monomethyl phosphate, diethyl phosphate, mono-n-butyl phosphate, di-i-butyl phosphate and diphenyl phosphate.

7. A method according to claim 1 wherein said aliphatic alcohol is one having from one to nine carbon atoms.

8. A method according to claim 1 wherein said aliphatic alcohol is selected from the group consisting of n-butyl alcohol, isopropyl alcohol and n-amyl alcohol.

9. A method according to claim 1, wherein said reaction is conducted at a temperature of from about −80° C to about 200° C.

10. A method according to claim 1, wherein aluminum alkoxide and said member selected from the group consisting of phosphoric acid and organophosphoric acid ester and alcohol are reacted and wherein the reaction product is reacted with said organometallic compound after removing any formed alcohol.

11. A method according to claim 1, wherein said reaction is carried out in an inert medium.

12. A method according to claim 11 wherein said inert medium is selected from the group consisting of an aliphatic hydrocarbon, an alicyclic hydrocarbon ether, and mixtures thereof.

13. A method according to claim 12, wherein said aliphatic hydrocarbon is selected from the group consisting of hexane, i-hexane, 3-methylpentane, 2,3-dimethylbutane, n-heptane, 2,2-dimethylpentane, 2-methylhexane, 3-methylhexane, n-octane i-octane and n-nonane.

14. A method according to claim 12, wherein said alicyclic hydrocarbon is selected from the group consisting of cyclobutane, cyclopentane, cyclohexane, cycloheptane, cyclooctane, cyclononane, decalin, and derivatives thereof attached to an organo group selected from the group consisting of carbon and hydrogen.

15. A method according to claim 12, wherein said ether is selected from the group consisting of diethyl ether, di-n-propyl ether, di-i-propyl ether, di-n-butyl ether, di-i-butyl ether, di-sec-butyl ether, diethylene glycol diethyl ether, anisol, phenetol, diphenyl ether, tetrahydrofuran, 1,4-dioxane, and 1,3-dioxane.

16. A method according to clam 1, wherein the amount of said catalyst is from about 0.05 to about 10 percent by weight, based on weight of said mono-oxirane compound.

17. A method according to claim 1, wherein the amount of said member selected from the group consisting of phosphoric acid and organophosphoric acid ester is from about 0.05 to about 3 moles, per one mole of said aluminum alkoxide.

18. A method according to claim 1 wherein the amount of said aliphatic alcohol is from one to 100 times by weight of the total amount of said aluminum alkoxide and said member selected from the group consisting of phosphoric acid and organophosphoric acid ester.

19. A method according to claim 1, wherein said catalyst further contains an organometallic compound selected from the group consisting of dialkyl zinc and trialkyl aluminum.

20. A method according to claim 19, wherein said organometallic compound is selected from the group consisting of zinc diethyl and aluminum triethyl.

21. A method according to claim 19 wherein the amount of said organometallic compound is from 0.01 to 10 moles per one mole of said aluminum alkoxide.

* * * * *